United States Patent
Almajid et al.

(10) Patent No.: US 12,031,413 B2
(45) Date of Patent: Jul. 9, 2024

(54) ENHANCING $CO_2$ SEQUESTRATION EFFICIENCY WITH $CO_2$-SOLUBLE THICKENER

(71) Applicant: SAUDI ARABIAN OIL COMPANY, Dhahran (SA)

(72) Inventors: Muhammad M. Almajid, Qatif (SA); Zuhair AlYousef, Saihat (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 233 days.

(21) Appl. No.: 17/653,181

(22) Filed: Mar. 2, 2022

(65) Prior Publication Data
US 2023/0279746 A1    Sep. 7, 2023

(51) Int. Cl.
  *E21B 41/00*    (2006.01)
  *B65G 5/00*    (2006.01)
  *C01B 32/50*    (2017.01)

(52) U.S. Cl.
  CPC ............ *E21B 41/0064* (2013.01); *B65G 5/00* (2013.01); *C01B 32/50* (2017.08)

(58) Field of Classification Search
  CPC ....... E21B 41/0064; B65G 5/00; B65G 5/005; C01B 32/50
  See application file for complete search history.

(56) References Cited

U.S. PATENT DOCUMENTS

| | | | |
|---|---|---|---|
| 4,701,270 A * | 10/1987 | Bullen | C09K 8/62 507/261 |
| 7,043,920 B2 | 5/2006 | Viteri et al. | |
| 9,815,626 B2 * | 11/2017 | Nazarian | B65G 5/00 |
| 10,024,149 B2 * | 7/2018 | Nazarian | E21B 43/164 |
| 10,030,483 B2 * | 7/2018 | Hancu | E21B 43/164 |

(Continued)

FOREIGN PATENT DOCUMENTS

| CA | 2650617 C | | 8/2012 | |
|---|---|---|---|---|
| CN | 105601823 A | * | 5/2016 | |
| CN | 113187459 A | * | 7/2021 | C09K 8/725 |

OTHER PUBLICATIONS

Buchgraber, Markus, et al., "A Study of Microscale Gas Trapping Using Etched Silicon Micromodels", Transp Porous Med, Springer Science+Business Media B.V., vol. 95, 2012, pp. 647-668 (22 pages).

(Continued)

*Primary Examiner* — Frederick L Lagman
(74) *Attorney, Agent, or Firm* — Osha Bergman Watanabe & Burton LLP (57) ABSTRACT

A method for increasing $CO_2$ sequestration efficiency in depleted reservoirs using a $CO_2$ thickener is provided. The method may include the steps of introducing a thickened $CO_2$ mixture into the depleted reservoir, where the thickened $CO_2$ mixture comprises a mixture of $CO_2$ and a $CO_2$ thickener. The method may include using $CO_2$ is in a liquid or supercritical state upon introduction into the depleted reservoir. The method may also include the step of using a $CO_2$ thickener comprising a methyl acrylate-based copolymer, a $CO_2$ solvent, and a solvent.

18 Claims, 7 Drawing Sheets

(56) References Cited

U.S. PATENT DOCUMENTS

| | | | |
|---|---|---|---|
| 10,577,248 B2* | 3/2020 | Harper, Jr. | ................ C02F 9/00 |
| 2017/0341942 A1* | 11/2017 | Harper, Jr. | ................ F01K 7/16 |
| 2020/0308947 A1* | 10/2020 | Willson | .............. E21B 43/2605 |

OTHER PUBLICATIONS

Grimstad, Alv-Arne, et al., "CO2 storage with mobility control", GHGT-14, 14th Annual Conference on Greenhouse Gas Control Technologies, Oct. 2018, pp. 1-14 (14 pages).

Okwen, Roland T., et al., "Analytical solution for estimating storage efficiency of geologic sequestration of CO2", International Journal of Greenhouse Gas Control, ScienceDirect, Elsevier Ltd., vol. 4, 2010, pp. 102-107 (6 pages).

Hinai, et al., "Experimental Evaluations of Polymeric Solubility and Thickeners for Supercritical CO2 at High Temperatures for Enhanced Oil Recovery", Energy Fuels, 2018, vol. 32, pp. 1600-1611, (12 pages).

Zhang, et al., "Evaluation of Polymers as Direct Thickeners for CO2 Enhanced Oil Recovery", J. Chem. Eng. Data, 2011, vol. 56, pp. 1069-1079 (11 pages).

Huang, et al., "Enhancement of the Viscosity of Carbon Dioxide Using Styrene/Fluoroacrylate Copolymers". Macromolecules, 2000, vol. 33, 5437-5442 (6 pages).

Rindfleisch, et al., "Solubility of Polymers and Copolymers in Supercritical CO2", J. Phys. Chem., 1996, vol. 100, 15581-15587 (7 pages).

Xu, et al., "Thickening Carbon Dioxide With the Fluoroacrylate-Styrene Copolymer", SPE Journal, Jun. 2003, pp. 85-91 (7 pages).

Heller, et al., "Direct Thickeners for MobilityControl of CO2 Floods", Society of Petroleum Engineers Journal, 1985, pp. 679-686 (8 pages).

Gullapalli, et al., "Gelling Behavior of 12-Hydroxystearic Acid in Organic Fluids and Dense CO2", Society of Petroleum Engineers, Inc., 1995, pp. 349-361 (13 pages).

* cited by examiner

ENHANCING $CO_2$ SEQUESTRATION EFFICIENCY WITH $CO_2$-SOLUBLE THICKENER

Carbon dioxide ($CO_2$) is a naturally occurring compound that is present in Earth's atmosphere. The $CO_2$ in the atmosphere may be derived from natural sources, such as respiration, or from human activities, such as the combustion of fossil fuels. The environmental effects of $CO_2$ in the atmosphere are of particular concern because $CO_2$ is a "greenhouse gas". A greenhouse gas has the ability to absorb light and radiate heat instead of reflecting it, elevating the temperature of the gas.

In efforts to slow down global warming, carbon capture and storage (CCS) has emerged as a possible solution for reducing $CO_2$ in the atmosphere. In a typical CCS process, atmospheric $CO_2$ is captured, compressed, and transported with the eventual goal of long-term storage in underground geological formations.

Porous and permeable formations may be suitable for sequestration of $CO_2$ because of their high trapping capacity. Generally, porosity is a measure of the void spaces inside a material. More specifically, the porosity of reservoir material is a measure of the ability of the reservoir material to hold a fluid. Permeability is a measure of the ability of a reservoir material to transmit fluids within, such as between rock grains. Both porosity and permeability of a reservoir formation are important factors to analyze when selecting a location for $CO_2$ sequestration. This is why depleted reservoirs are good candidates for $CO_2$ sequestration.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed herein relate to a method for increasing $CO_2$ sequestration efficiency in depleted reservoirs using a $CO_2$ thickener. The method may include the steps of introducing a thickened $CO_2$ mixture into the depleted reservoir, where the thickened $CO_2$ mixture comprises a mixture of $CO_2$ and a $CO_2$ thickener. The method my include using $CO_2$ in a liquid or supercritical state upon introduction into the depleted reservoir. The method may also include the step of using a $CO_2$ thickener comprising a methyl acrylate-based copolymer, a $CO_2$ solvent, and a solvent.

Other aspects and advantages of the claimed subject matter will be apparent from the following Detailed Description and the appended Claims.

BRIEF DESCRIPTION OF DRAWINGS

Certain aspects of the presently disclosed subject matter will be described with reference to the accompanying drawings, which are representative and schematic in nature and are not to be considered to be limiting in any respect as it relates to the scope of the subject matter disclosed.

While the subject matter disclosed is susceptible to various modifications and alternative forms, specific embodiments have been shown by way of example in the Drawings and are described in detail. It should be understood, however, that the Detailed Description of is not intended to limit the disclosed subject matter to the particular forms disclosed, but on the contrary, the intention is to cover all modifications, equivalents, and alternatives falling within the spirit and scope of the disclosed subject matter as defined by the appended claims.

Typically, down is toward or at the bottom and up is toward or at the top of a figure. "Up" and "down" are oriented relative to a local vertical direction. However, in the oil and gas industry, one or more activity may take place in deviated or horizontal wells. Therefore, one or more figure may represent an activity in vertical, approximately vertical, deviated, approximately horizontal, or horizontal wellbore configuration. The well includes a bored hole (that is, borehole) that extends from the surface towards a target zone of the formation, such as the reservoir. An upper end of the wellbore, terminating at or near the surface, may be referred to as the "up-hole" end of the wellbore, and a lower end of the wellbore, terminating in the formation, may be referred to as the "downhole" end of the wellbore.

DETAILED DESCRIPTION $CO_2$ is often injected into hydrocarbon-bearing formations (that is, reservoirs) as part of the enhanced oil and gas recovery (EOR) processes. Recently, capturing, and injecting $CO_2$ into reservoirs for $CO_2$ sequestration has garnered interest as a possible method for storing carbon in depleted oil and gas reservoirs. Depleted oil and gas reservoirs (collectively "depleted reservoirs") may have some residual hydrocarbons present, but they are present in unrecoverable quantities, which makes such depleted reservoirs ideal as carbon storage locations.

However, traditional $CO_2$ sequestration processes have very low efficiency. "Efficiency" is defined as the ratio of the volume of $CO_2$ trapped within the depleted reservoir to the pore volume of the depleted reservoir. Traditional $CO_2$ sequestration projects have demonstrated sequestration efficiencies of five percent or less. Low sequestration efficiency is mainly due to the reduced density of the $CO_2$ compared to other fluids found in a depleted reservoir, such as brine and residual hydrocarbons. Also, the low specific gravity of $CO_2$ causes upward migration of $CO_2$ and pooling at to the top of the depleted reservoir, also known as "gravity override". At the boundary of the interface between the depleted reservoir and the overburden, the $CO_2$ collects as a layer of a separated yet continuous fluid phase. This near-homogenous layer of $CO_2$ fluid makes it difficult for $CO_2$ to dissolve into other fluids in the formation or to react with the formation material and chemically convert into an inert substance.

During introduction of the $CO_2$, the efficiency of the $CO_2$ trapped within the depleted reservoir is also reduced by an effect known as viscous fingering. Viscous fingering occurs because the viscosity of the formation fluids in a reservoir are greater than the viscosity of the introduced $CO_2$. The difference in the viscosities of the $CO_2$ and the formation fluids causes a condition where the interface of two liquids bypasses sections of the depleted reservoir as well as fluids contained therein as the introduced $CO_2$ moves inward, creating an uneven, or fingered, profile. Viscous fingering may cause $CO_2$ to bypass much of the pore space of the depleted reservoir, thereby reducing the total volume utilized for sequestration.

Sequestration efficiency may be increased by decreasing $CO_2$ mobility within the reservoir. "$CO_2$ mobility" is defined as the rate at which the $CO_2$ in formation water migrates to the top of the reservoir. One technique used to reduce $CO_2$ mobility is by increasing the apparent viscosity of the $CO_2$. One method to increase the apparent viscosity is to introduce $CO_2$ with a $CO_2$ soluble thickener ($CO_2$ thickener).

In spite of many years of research, a thickener configured to dissolve in $CO_2$ at diluted concentrations to decrease the mobility of $CO_2$ and to permit such decreased mobility $CO_2$ to intimately intermix with brines and residual hydrocarbons in a depleted reservoir environment has not been found. A major hindrance has been the limited solubility of thickeners in $CO_2$ at reservoir conditions where the $CO_2$ may be in a liquid, critical, or supercritical state.

Another major hinderance has been identifying environmentally friendly thickeners among ones that do seem to function with $CO_2$ at reservoir conditions. For example, some effective thickeners are fluoroacrylate-styrene copolymers. However, environmental issues associated with using fluorinated materials have discouraged the use of such thickeners in depleted reservoirs.

A useful thickener for thickening $CO_2$ may comprise a mixture of one or more polymers or compounds containing $CO_2$-solublilizing or "$CO_2$-philic" groups. The thickener may also contain "$CO_2$-phobic" functionalities that promote viscosity-enhancing intermolecular associations. A useful $CO_2$ thickener may be effective, safe to users, and is not harmful to the environment. Also, a useful thickener may be water-insoluble such that it may dissolve in $CO_2$ at either or both standard wellhead and reservoir conditions, thereby elevating the viscosity of the mixture but not break apart in the presence of the brine.

Several potential useful $CO_2$ thickeners have been identified. In one or more particular embodiments, a mixture of compounds that result in thickening of the $CO_2$ may include a methyl acrylate-based copolymer that may be in a range of from about 25 wt % (weight percent) to 40 wt % based on the total amount of the $CO_2$ thickener, a $CO_2$ solvent (for example, propylene carbonate, allyl ethyl carbonate, or dimethyl carbonate) that may be in a range of from about 45 wt % to 65 wt % based on the total amount $CO_2$ thickener, and a solvent (for example, a white oil, petroleum ether, or silicone oil) that may be in a range of from about 10 wt % to 15 wt % based on the total amount of the $CO_2$ thickener.

The $CO_2$ thickener may include other compounds as well, such as copolymers of allenethers, acrylates, acrylic long carbon chain esters or benzenes. In one or more embodiments, the long carbon chain of the acrylic long carbon chain esters may be in a range of from about 8 to 18 carbons in length. In one or more embodiments, methyl acrylate, dimethyl carbonate, divinyl ether, and acrylate may form a copolymer with the long carbon chain esters; however, other types of carbonates, acrylates, and divinyl ethers may be polymerized with long carbon chain may be used.

Such $CO_2$ thickeners are capable of dissolving into $CO_2$. The $CO_2$ thickener may improve the $CO_2$ mobility ratio, that is reduce the mobility of the mixture versus $CO_2$ without the $CO_2$ thickener. Such thickened $CO_2$ enhances its storage capacity in depleted reservoirs. Such thickeners are also environmentally friendly because useful $CO_2$ thickeners do not contain fluoroacrylate-styrene copolymers. An example of a useful $CO_2$ thickener is APFR-2 provided by Beijing AP Polymer Technology CO., Ltd. (Beijing, China).

In one or more embodiments, the $CO_2$ is introduced in a liquid state. In one or more embodiments, the $CO_2$ is introduced as a critical fluid. In one or more embodiments, the $CO_2$ is introduced as a supercritical fluid. In one or more embodiments, the $CO_2$ is introduced proximate to the bottom of the depleted reservoir. The $CO_2$ of one or more embodiments has purity from 50% to 100%.

In one or more embodiments, the $CO_2$ thickener is present in a concentration in a range of from about 0.05 vol % (volume percent) to 3.0 vol % in the $CO_2$ thickener mixture. In such embodiments, the $CO_2$ thickener present in a concentration in the $CO_2$ thickener mixture may have a lower limit of one of 0.05, 0.2, 0.3, 0.5, 0.7, 0.9, 1.0, 1.2, and 1.5 vol. % and an upper limit of one of 0.5, 0.7, 0.9, 1.0, 1.2, 1.5, 1.7, 1.8, 1.9, and 3.0 vol. %, where any lower limit may be paired with any mathematically compatible upper limit.

A viscosity range of the thickened $CO_2$ mixture may be from about 90 cP to 120 cP.

Figure 1:
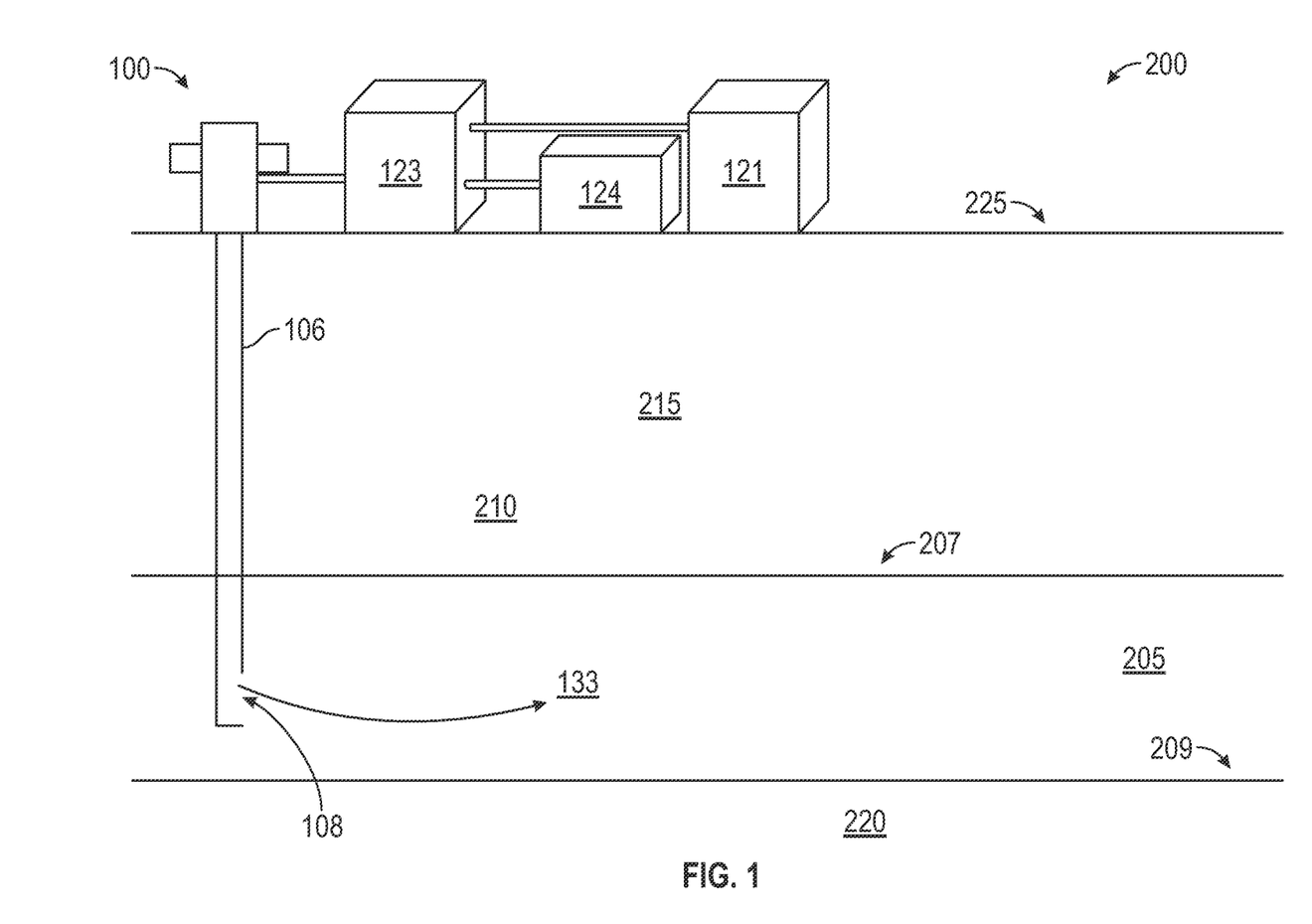
FIG. 1 is a diagram that illustrates a reservoir environment where the thickened $CO_2$ is injected through a well in accordance with one or more embodiments.

FIG. 1 is a diagram that illustrates a well environment in accordance with one or more embodiments. The well environment 200 includes a depleted reservoir 205 having a reservoir upper interface 207 and a reservoir lower interface 209. Above the reservoir upper interface 207 is a fluid-impenetrable overburden 210, which is part of subsurface 215. Below the reservoir lower interface 209 is the underburden 220, which is also part of the subsurface 215.

The depleted reservoir may comprise matrix materials including, but not limited to, limestone, sandstone, and shale. Other matrix materials may be unconventional, including, but not limited to, marble, granite, or basalt.

The well environment 200 also includes a surface 225 representing the surface of the Earth, and a subsurface 215 below the surface 225. Traversing through subsurface 215 environment is a portion of the well injection system 100, which is part of the well environment 200. The well injection system 100 includes an injection well 106. A bottomhole 108 of the injection well 106 is positioned proximate to the reservoir lower interface 209 but within the depleted reservoir 205. In one or more embodiments, the underburden 220 is porous and permits $CO_2$ migration. In some embodiments, the injection well 106 may transverse into the underburden 220 and bottomhole 108 of the injection well 106 is positioned in the underburden 220.

FIG. 1 shows $CO_2$ and $CO_2$ thickener stored on the surface 225 in a $CO_2$ storage 121 and a $CO_2$ thickener storage 124.

In one or more embodiments, the $CO_2$ thickener and the $CO_2$ are intermixed in a mixing tank 123, causing the $CO_2$ thickener to dissolve into the $CO_2$ and the thickened $CO_2$ mixture to form. In one or more embodiment, where a pressure of the thickened $CO_2$ mixture is in a pressure in a range of from about 1500 to 3000 pounds per square inch (psi). The $CO_2$ may be in the state of a gas, a liquid, a critical fluid, or a supercritical fluid. However, $CO_2$ has very low density in a gaseous state compared to the density of formation fluids, such as brine and hydrocarbons. The very low density increases the upward mobility of the $CO_2$. In contrast, both liquid and supercritical $CO_2$ have greater densities than $CO_2$ gas. The densities of liquid, critical, and supercritical $CO_2$ are much closer to the densities of formation fluids in the reservoir. The similar density of the liquid, critical, and supercritical $CO_2$ with respect to the formation fluids reduces the upward mobility of $CO_2$. The denser phases of $CO_2$, whether liquid, critical, or supercritical, are useful but not exclusive.

In one or more embodiments, the thickened $CO_2$ mixture is introduced into the depleted reservoir 205 from injection well 106. The thickened $CO_2$ mixture traverses into depleted reservoir 205 from the injection well bottomhole 108 (see arrow), as shown in FIG. 1.

The introduction of the thickened $CO_2$ mixture is not so limited to be introduced into merely depleted hydrocarbon-bearing formations. The thickened $CO_2$ mixture may be introduced into conventional formations and reservoirs, such as, but not limited to, depleted oil and gas reservoirs, deep saline aquifers, or basaltic formations, and unconventional reservoirs, such as, but not limited to, coal beds and fractured or tight gas formations.

The depleted reservoir 205 of FIG. 1 is expected to contain at least formation water and residual hydrocarbons. The relative density of the thickened $CO_2$ mixture is greater than the $CO_2$ fluid without $CO_2$ thickener. $CO_2$ without $CO_2$ thickener incorporated would suffer from gravity override and would eventually migrate to the upper reservoir interface 207 because of its mobility. However, the thickened $CO_2$ mixture is denser and therefore, it migrates in a direction that is more towards the reservoir lower interface 209.

The interactions between the thickened $CO_2$ mixture 133, residual formation fluids, and the structure of the formation may increase the pressure within the depleted reservoir 205. A localized pressure gradient may increase as fluid flow pathways are blocked by the thickened $CO_2$ mixture 133 because it is viscous in nature. In introducing the thickened $CO_2$ mixture, the reservoir pressure should be monitored and maintained at a value less than the fracture pressure of the depleted reservoir. This is because reservoir pressure that is too great may cause undesired fracturing within the formation and even damage the sealing capability of the overburden at the of the upper reservoir boundary.

Fracture pressure is typically determined before oil and gas drilling activities commence; therefore, the fracture pressure is usually known before implementing this method in a depleted reservoir or could be determined later using known techniques. In one or more embodiments, if the reservoir pressure exceeds a value approximately greater than that of the fracture pressure, the high pressure may be decreased by injecting pure $CO_2$ from the $CO_2$ storage. The pure $CO_2$ instead of thickened $CO_2$ is introduced into the depleted reservoir until the pressure issue is alleviated. In one or more embodiments, the thickened $CO_2$ is introduced into a depleted reservoir at a pressure that is not greater than 90% of the fracture pressure value for the depleted reservoir, such as not greater than 85%, or not greater than 80%, or not greater than 75%, or not greater than 70%.

It is important to note that the well injection system does not include a recovery or production well. The depleted reservoir used in this method has already had productive hydrocarbons extracted. Depleted reservoirs are utilized for sequestration of $CO_2$ and not hydrocarbon exploitation or are plugged and monitored.

Figure 4:
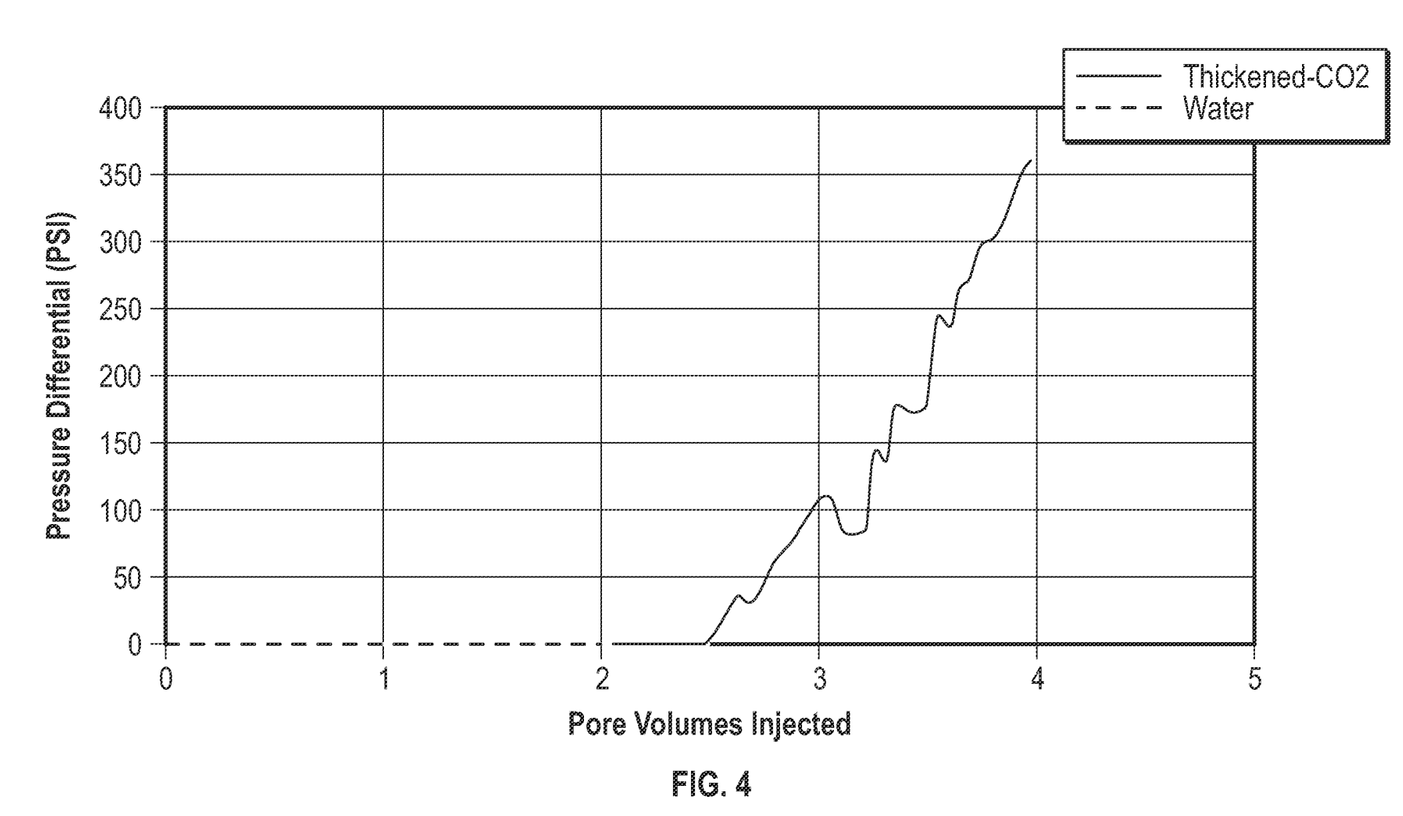
FIG. 4 is a graph showing pressure differential versus pore volume in accordance with one or more embodiments of the present disclosure.

Although the injection well of well injection system in FIG. 4 shows a vertical well, the configuration of the injection well configuration itself is not so limited. The configuration of any injection well may be vertical, approximately vertical, deviated, approximately horizontal, horizontal, and combinations thereof. The injection well may also be a multi-lateral, a multi-level, or both types of injection well systems.

Various mechanisms ensure that mixtures of an introduced $CO_2$ and $CO_2$ thickener combination is eventually trapped and sequestered in a depleted reservoir. Some mechanisms for $CO_2$ trapping inside the depleted hydrocarbon-bearing formation may include static trapping, structural trapping, stratigraphic trapping, hydrodynamic trapping, and capillary trapping.

Examples

The following examples are merely illustrative and should not be interpreted as limiting the scope of the present disclosure Some properties of APFR-2 thickener is summarized in Table 1.

TABLE 1

Properties of APFR-2 thickener

| Properties | Value |
|---|---|
| Molecular Weight | 500,000 g/mol |
| pH | 5.0-8.0 |
| Appearance | White emulsion |
| Relative Density | 0.90-1.10 |
| Solubility | Soluble in liquid and supercritical $CO_2$ |
| Dissolution speed of 1% of the chemical in liquid $CO_2$ at 25° C. | ≤3 minutes |

Figure 2A:
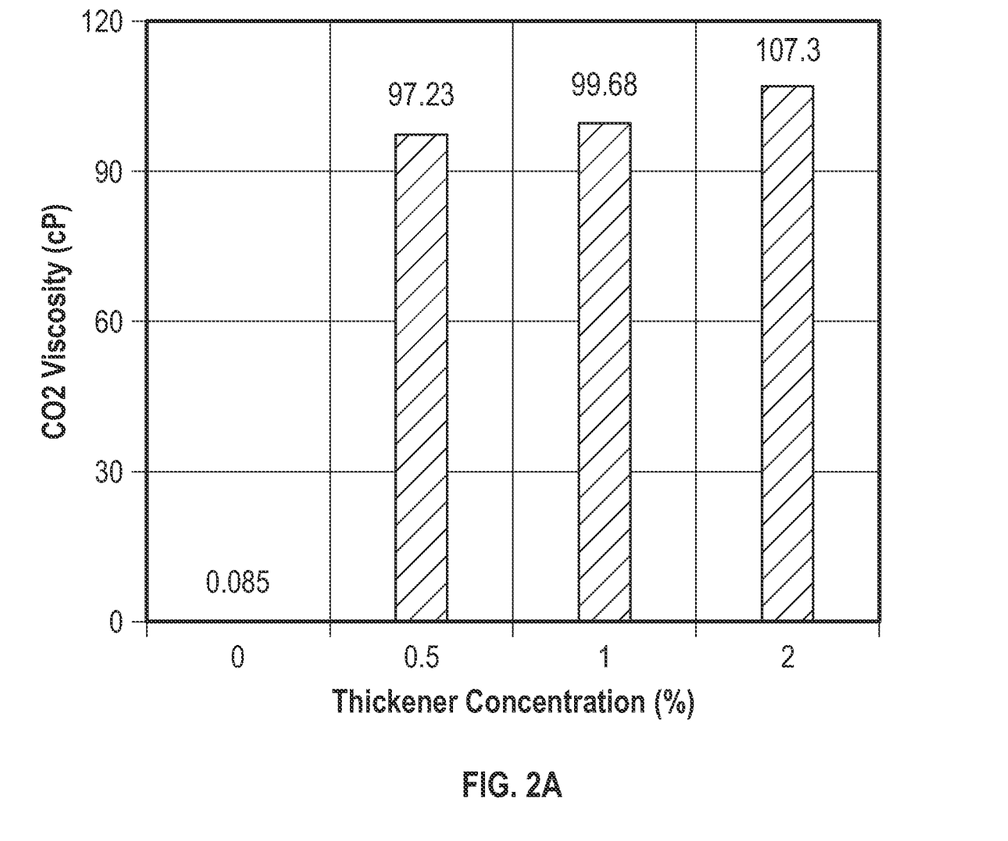
FIG. 2A is a graph showing $CO_2$ viscosity versus thickener concentration in accordance with one or more embodiments of the present disclosure.
Figure 2B:
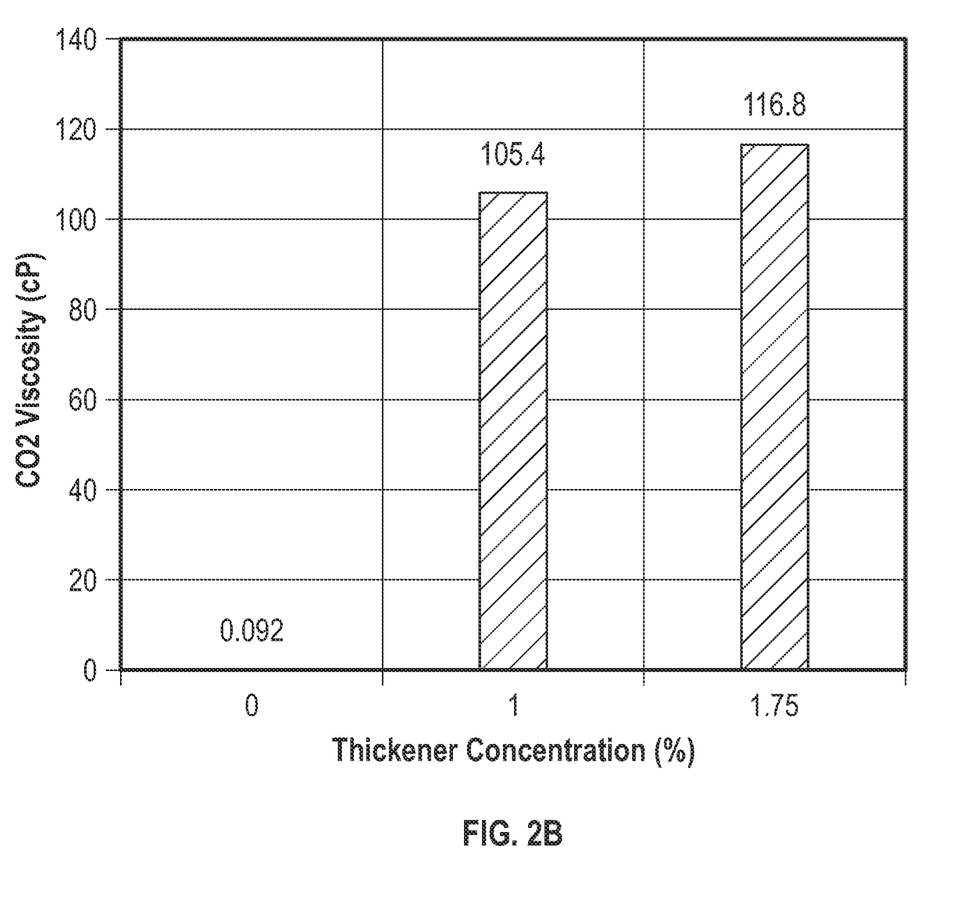
FIG. 2B is a graph showing $CO_2$ viscosity versus thickener concentration in accordance with one or more embodiments of the present disclosure.

The properties of several embodiments of the thickened $CO_2$ mixture were determined. $CO_2$ during these experiments had a purity of about 99.50%. FIGS. 2A-2B show the viscosity of the thickened $CO_2$ versus APFR-2 thickener concentrations at two different pressures. Pressure is an important measurement because thickened $CO_2$ is exposed to elevated pressures, that is, pressures greater than atmospheric, in subsurface reservoirs used for $CO_2$ sequestration.

A comparative example included $CO_2$ with no APFR-2 thickener, that is, 0 volume percent (vol %) of introduced APFR-2 thickener. $CO_2$ was mixed with 0.5, 1, and 2 vol % of the APFR-2 thickener, respectively, making three examples of thickened $CO_2$ mixtures. All four samples (i.e., the comparative example, and the 3 inventive examples) were measured for actual viscosity in centipoise (cP). A Cambridge viscometer apparatus was used for viscosity measurements. In FIG. 2A, viscosities of the comparative example and the three examples were measured at a pressure of 2000 pounds per square inch (psi). Liquid $CO_2$ was provided at a pressure of 2000 psi and a temperature of 25° C.

The comparative example was determined to be 0.085 centipoise (cP). At a concentration of 0.5 vol % APFR-2 thickener, the viscosity of the example thickened $CO_2$ mixture increased to 97.23 cP. At 1 vol % of APFR-2 thickener, the viscosity of the example thickened $CO_2$ mixture increased to 99.68 cP. At 2 vol % of APFR-2 thickener, the viscosity of the example thickened $CO_2$ mixture increased to 107.3 cP.

The same test was performed at a greater pressure. In FIG. 2B, liquid $CO_2$ was provided at a pressure of 2500 psi and a temperature of 25° C. The APFR-2 thickener concentrations of 0, 1, and 1.75 vol % were used, respectively, at the same $CO_2$ conditions. The comparative example of $CO_2$ without APFR-2 thickener was determined to be 0.092 cP. Similar to the previous results, upon introduction of the APFR-2 thickener the viscosity increased significantly. For example, by adding 1 vol % of APFR-2 thickener, the viscosity of the embodiment thickened $CO_2$ mixture increased to 105.4 cP. At 1.75 vol % of APFR-2 thickener, the viscosity of the embodiment thickened $CO_2$ mixture increased to 116.3 cP.

Figure 3A:
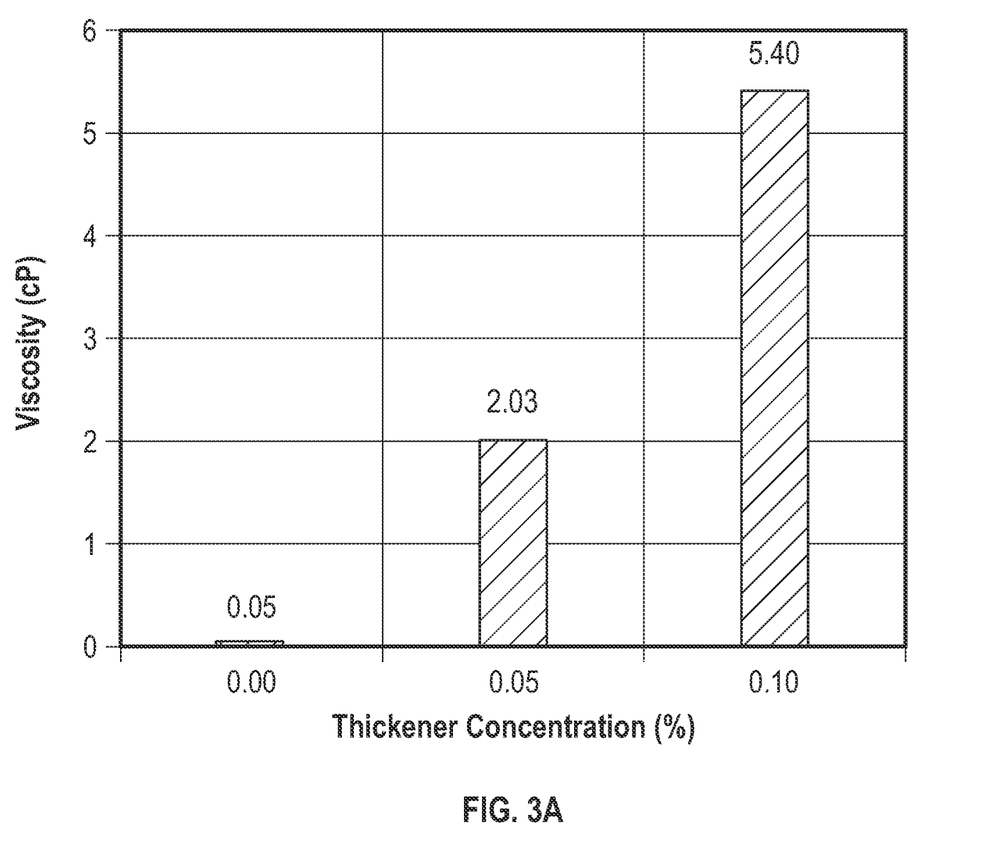
FIG. 3A is a graph showing $CO_2$ viscosity versus thickener concentration in accordance with one or more embodiments of the present disclosure.
Figure 3B:
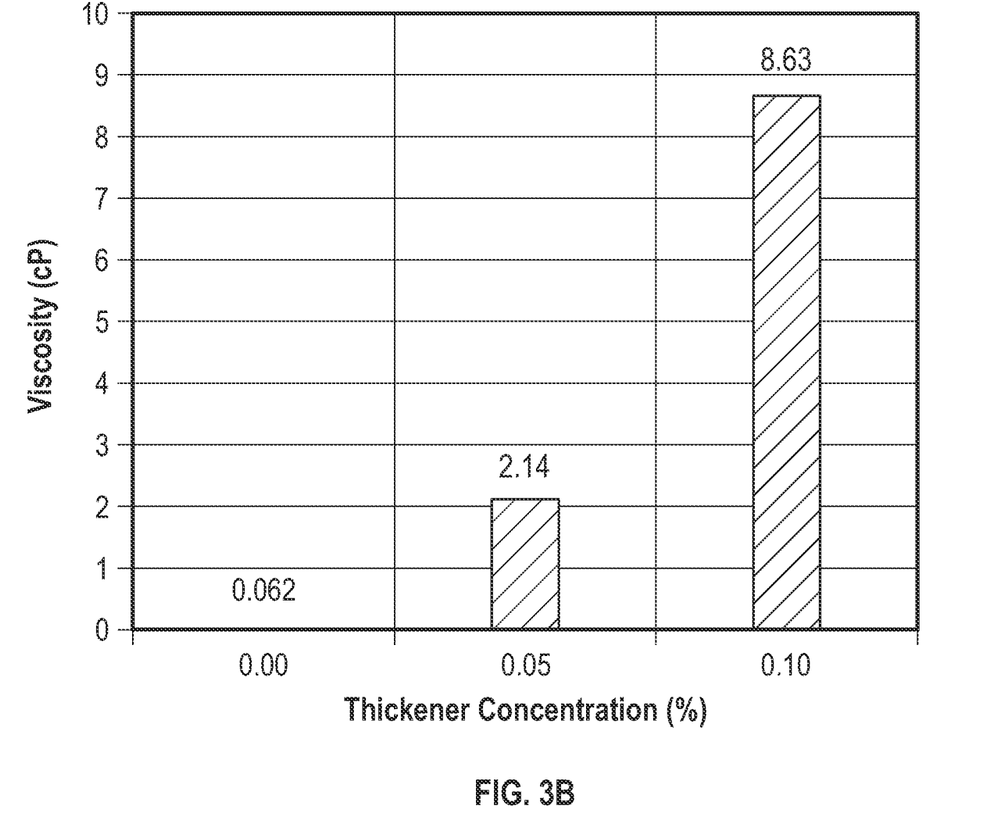
FIG. 3B is a graph showing $CO_2$ viscosity versus thickener concentration in accordance with one or more embodiments of the present disclosure.
Figure 3C:
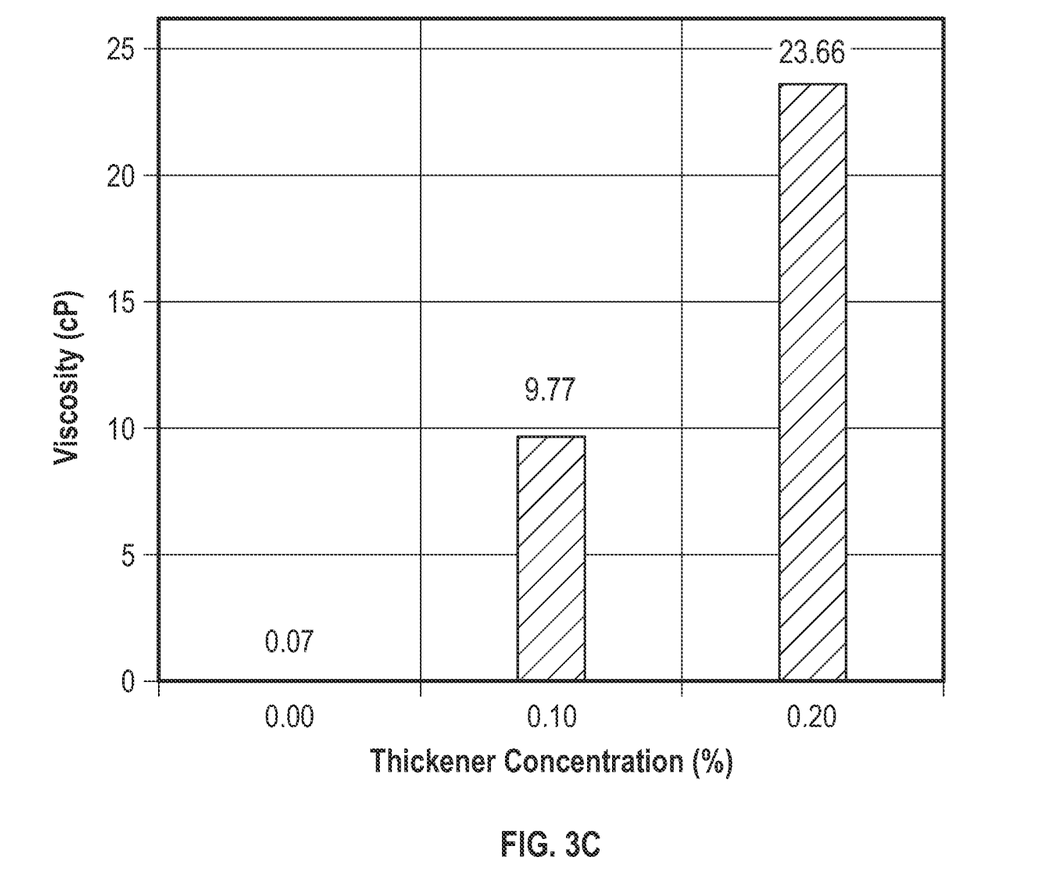
FIG. 3C is a graph showing $CO_2$ viscosity versus thickener concentration in accordance with one or more embodiments of the present disclosure.

FIGS. 3A-3C show the viscosity of the thickened $CO_2$ versus APFR-2 thickener concentrations at three different pressures. In FIGS. 3A-3C, supercritical $CO_2$ was used instead liquid $CO_2$. $CO_2$ has a critical point of 31° C. and 1070 pounds per square inch (psi).

A comparative example included $CO_2$ with no APFR-2 thickener, that is, 0 volume percent vol % of introduced APFR-2 thickener. $CO_2$ was mixed with 0.05 and 0.10 vol % of the APFR-2 thickener, respectively, make two examples of thickened $CO_2$ mixtures. All three samples were measured for actual viscosity in centipoise (cP). A Cambridge viscometer apparatus was used for viscosity measurements. In FIG. 3A, viscosities of the comparative example and the two examples were measured at a pressure of 2000 pounds per square inch (psi). Supercritical $CO_2$ was provided at a pressure of 2000 psi and a temperature of 50° C.

The comparative example was determined to be 0.05 centipoise (cP). At a concentration of 0.05 vol % APFR-2 thickener, the viscosity of the example thickened $CO_2$ mixture increased to 2.03 cP. At 0.01 vol % of APFR-2 thickener, the viscosity of the example thickened $CO_2$ mixture increased to 5.40 cP.

The same test was performed at a greater pressure. In FIG. 3B, supercritical $CO_2$ was provided at a pressure of 2500 psi and a temperature of 50° C. The APFR-2 thickener concentrations of 0, 0.05, and 0.10 vol % were used, respectively, at the same $CO_2$ conditions. The comparative example of $CO_2$ without APFR-2 thickener was determined to be 0.062 cP. Similar to the previous results, upon introduction of the APFR-2 thickener the viscosity increased significantly. For example, by adding 0.05 vol % of APFR-2 thickener, the viscosity of the embodiment thickened $CO_2$ mixture increased to 2.14 cP. At 0.10 vol % of APFR-2 thickener, the viscosity of the embodiment thickened $CO_2$ mixture increased to 8.63 cP.

In FIG. 3C, the same test was performed at a greater pressure and supercritical $CO_2$ was provided at a pressure of 3000 psi and a temperature of 50° C. The APFR-2 thickener concentrations of 0, 0.10, and 0.20 vol % were used, respectively, at the same $CO_2$ conditions. The comparative example of $CO_2$ without APFR-2 thickener was determined to be 0.07 cP. Similar to the previous results, upon introduction of the APFR-2 thickener the viscosity increased significantly. For example, by adding 0.10 vol % of APFR-2 thickener, the viscosity of the embodiment thickened $CO_2$ mixture increased to 9.77 cP. At 0.20 vol % of APFR-2 thickener, the viscosity of the embodiment thickened $CO_2$ mixture increased to 23.66 cP.

The results of the experiments in FIGS. 2A, 2B, 3A, 3B and 3C also demonstrate that introducing of a small volume of APFR-2 thickener (0.05 vol %) significantly increases $CO_2$ viscosity. A small volume of APFR-2 thickener may be used to thicken $CO_2$ in reservoirs. In one or more embodiments, the $CO_2$ thickener concentration used in the reservoir with $CO_2$ is in a range of about 0.05 to 0.20 vol %.

It is also noteworthy that as pressure increased so did the viscosity of the embodiment thickened $CO_2$ mixtures. One may compare the results of the 1 vol % APFR-2 between 2000 and 2500 psi using the data provided in FIGS. 2A and 2B. A notable rise in fluid viscosity is detected that may suggest increasing sequestering pressure to as close to the formation fracture pressure as feasible.

Further, the experiments also demonstrate that the APFR-2 thickener is stable and dissolves in $CO_2$ at a pressure of around 2000 to 3000 psi. The thickened $CO_2$ has also demonstrated a robust temperature endurance within a temperature in a range of from about 20° C. to 150° C.

In an experiment, liquid $CO_2$ was mixed with of the APFR-2 thickener and injected into a porous and permeable media. A type of carbonate rock known as Indiana limestone was used in this experiment. The length of the carbonate rock was 4 inches, and the diameter was 1.5 inches. The carbonate rock sample had a porosity of 18% and a permeability of 58.9 millidarcys (mD). Table 2 shows rock properties and the experimental conditions.

TABLE 2

| | Indiana Limestone properties and experimental conditions | | | | | | |
|---|---|---|---|---|---|---|---|
| Rock | Length Inches | Diameter Inches | Porosity % | Permeability mD | Injection rate ml/min | Pressure Psi | Temperature ° C. |
| Indiana Limestone | 4 | 1.5 | 18 | 58.9 | 5 | 2000 | 30 |

The APFR-2 thickener and the liquid $CO_2$ were mixed at 30° C. to create a thickened $CO_2$ mixture with a concentration of 2 vol % APFR-2 thickener and 98 vol % supercritical $CO_2$.

Initially, deionized water was injected into the rock sample at a rate of 5 milliliters per minute (ml/min) at a pressure of 2000 psi for up to 2 core volumes. The thickened $CO_2$ mixture was then introduced into the carbonate rock sample behind the deionized water at the same rate and pressure.

FIG. 4 displays the measured pressure differential across the core of the rock sample versus the number of pore volumes injected. The pressure drop is referred to the difference between the inlet and the outlet pressures. The results demonstrate a marked increase in pressure differential across the core sample almost upon immediate introduction of the thickened $CO_2$ mixture (at PV ~2). The results indicate that gas mobility has significantly decreased since the pressure required to displace the thickened $CO_2$ mixture in the core sample has significantly increased—not even gas pressure is effectively communicated through the core sample.

Additional analysis of the results indicates that injecting thickened $CO_2$ mixture into the carbonate rock sample effectively reduced permeability of the core sample from 58.9 mD to 1.3 mD. This corresponds to approximately a factor of 45 times reduction in permeability, indicating the pores and pore throats becoming clogged with the thickened $CO_2$ mixture. By implication, the mixed $CO_2$ is trapped not only in the pores of the core sample but also in the throats, preventing only the smallest fluid communication through the core sample.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the words "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Thus, particular implementations of the subject matter have been described. Other implementations are within the scope of the following claims.

Although only a few example embodiments have been described in detail, those skilled in the art will readily appreciate that many modifications are possible in the example embodiments without materially departing from the described scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f), for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of." The words "comprise," "has," and "include" and all grammatical variations thereof are each intended to have an open, non-limiting meaning that does not exclude additional elements or steps.

What is claimed as new and desired to be protected by Letters Patent of the United States is:

1. A method for sequestering carbon dioxide ($CO_2$), in a depleted reservoir, the method comprising:
   introducing a thickened $CO_2$ mixture into the depleted reservoir, wherein the thickened $CO_2$ mixture comprises:
   $CO_2$
   a $CO_2$ thickener comprising a methyl acrylate-based copolymer;
   a CO2 solvent selected from the group consisting of propylene carbonate, allyl ethyl carbonate, or dimethyl carbonate, and combinations thereof; and
   a solvent.

2. The method of claim 1, wherein a viscosity of the thickened $CO_2$ mixture is in a range of from about 90 cP to 120 cP.

3. The method of claim 1, wherein a pressure of the thickened $CO_2$ mixture is in a pressure in a range of from about 1500 to 3000 psi.

4. The method of claim 1, wherein the $CO_2$ thickener in the thickened $CO_2$ mixture is in a concentration in a range of from about 0.05 vol % to 3.0 vol %.

5. The method of claim 1, wherein the $CO_2$ is in a liquid state upon introduction into the depleted reservoir.

6. The method of claim 1, wherein the $CO_2$ is in a supercritical state upon introduction into the depleted reservoir.

7. The method of claim 1, further comprising a step of mixing the $CO_2$ with the $CO_2$ thickener on a surface of earth to form the thickened $CO_2$ mixture.

8. The method of claim 1, further comprising a step of introducing the thickened $CO_2$ mixture into the depleted reservoir when a reservoir pressure in a range of up to 90% of a fracture pressure of the depleted reservoir.

9. The method of claim 1, wherein the $CO_2$ thickener comprises a copolymer of allenethers, acrylate, acrylic long carbon chain esters/benzenes, propylene carbonate/allyl ethyl carbonate, dimethyl carbonate, white oil/silicon or oil/petroleum ether, and combinations thereof.

10. The method of claim 1, wherein the methyl acrylate-based copolymer is in in a range of from about 25 wt % to 40 wt % of the $CO_2$ thickener.

11. The method of claim 1, wherein the $CO_2$ solvent is in a range of from about 45 wt % to 65 wt % of the $CO_2$ thickener.

12. The method of claim 1, wherein the solvent is in a range of from about 10 wt % to 15 wt % of the $CO_2$ thickener.

13. The method of claim 1, wherein the solvent is selected from the group consisting of white oil, petroleum ether, or silicone oil, and combinations thereof.

14. A method for sequestering carbon dioxide ($CO_2$), in a depleted reservoir, the method comprising:
   introducing a thickened $CO_2$ mixture into the depleted reservoir, wherein the thickened $CO_2$ mixture comprises:
      $CO_2$;
      a $CO_2$ thickener comprising a methyl acrylate-based copolymer;
      a CO2 solvent; and
      a solvent selected from the group consisting of white oil, petroleum ether, or silicone oil, and combinations thereof.

15. The method of claim 14, wherein the solvent is in a range of from about 10 wt % to 15 wt % of the $CO_2$ thickener.

16. The method of claim 14, wherein a viscosity of the thickened $CO_2$ mixture is in a range of from about 90 cP to 120 cP.

17. The method of claim 14, wherein a pressure of the thickened $CO_2$ mixture is in a pressure in a range of from about 1500 to 3000 psi.

18. The method of claim 14, wherein the $CO_2$ solvent is selected from the group consisting of propylene carbonate, allyl ethyl carbonate, or dimethyl carbonate, and combinations thereof.

* * * * *